United States Patent [19]

Jin

[11] Patent Number: 5,548,456
[45] Date of Patent: Aug. 20, 1996

[54] DECK MECHANISM FOR MAGNETIC RECORD AND PLAYBACK DEVICE

[75] Inventor: Hong J. Jin, Seoul, Rep. of Korea

[73] Assignee: Goldstar Co., Ltd., Seoul, Rep. of Korea

[21] Appl. No.: 355,316

[22] Filed: Dec. 12, 1994

Related U.S. Application Data

[63] Continuation of Ser. No. 873,184, Apr. 24, 1992, abandoned.

[30] Foreign Application Priority Data

Apr. 24, 1991 [KR] Rep. of Korea .................... 6600/1991

[51] Int. Cl.⁶ ............................ G11B 5/027; G11B 15/00
[52] U.S. Cl. ................................... 360/85; 360/95
[58] Field of Search ................................ 360/85, 96.3, 95, 360/96.5

[56] References Cited

U.S. PATENT DOCUMENTS

| | | | |
|---|---|---|---|
| 4,914,536 | 4/1990 | Yamanaka | 360/96.3 |
| 5,070,422 | 12/1991 | Sasaki et al. | 360/85 |
| 5,086,359 | 2/1992 | Tsuchiya | 360/85 |
| 5,103,356 | 4/1992 | Fujiwara et al. | 360/95 |
| 5,144,507 | 9/1992 | Kurita | 360/96.3 |

FOREIGN PATENT DOCUMENTS 62-16267  1/1987  Japan ................................ 360/96.3

*Primary Examiner*—Stuart S. Levy
*Assistant Examiner*—David D. Davis

[57] ABSTRACT

A deck mechanism for a magnetic record and playback device such as a digital audio cassette tape recorder or a video cassette tape recorder. The deck mechanism includes a clutch member for selectively transmitting the drive power of a driving gear of a capstan motor to a take-up reel-side loading gear and a mode sensing member for sensing the loading and unloading modes. The clutch member has a clutch lever mounted on a main base between the driving gear of the capstan motor and the loading gear, a clutch gear for engaging/disengaging the driving gear of the capstan motor with/from the loading gear, and a cam gear for driving the clutch lever. The mode sensing member has a pair of rotary type mode switches for stopping the rotation of the cam gear and also driving the capstan motor so as to load or unload tape travel guide elements in accordance with a selected mode, thereafter, sensing the rotated position of the loading gear so as to drive the cam gear by using the drive power of the loading motor.

4 Claims, 5 Drawing Sheets

DECK MECHANISM FOR MAGNETIC RECORD AND PLAYBACK DEVICE

This application is a continuation of application Ser. No. 07/873,184 filed on Apr. 24, 1992, now abandoned.

BACKGROUND OF THE INVENTION

1. Field of the Invention

The present invention relates to a deck mechanism for a magnetic record and playback device such as a digital audio cassette tape recorder or a video cassette tape recorder.

2. Description of the Prior Art

In conventional digital audio cassette tape recorders (DATs) or video cassette tape recorders (VCRs), a single loading motor is utilized for driving various elements of a driving system to carry out various operation modes such as ejecting, loading, unloading, stopping and playing. To the loading motor, a main cam is operatively connected, to which the above-mentioned various elements of driving system are also operatively connected, to perform required operations.

As a result, the cam is complex in construction and large in size, since it should perform all operation modes.

On the other hand, in a tape loading mode interval, a slant post assembly, a tension post and a take-up roller are arranged to take a tape out of an opening, namely, a mouth of a tape cassette, load the tape on a head drum and travel the tape. The above-mentioned elements should be maintained at a fixed state, in mode intervals other than the tape loading mode interval.

However, the cam which rotates by a drive power from the loading motor is operated in all operation modes, whereas functioning elements of a tape loading device are selectively connected to the cam to be driven only in required operation modes. Accordingly, it is necessary to provide a complex intermittence device for preventing the functioning elements from being driven in mode intervals other than the tape loading mode interval.

SUMMARY OF THE INVENTION

Therefore, an object of the invention is to eliminate the above-mentioned disadvantage encountered in the prior art.

The present invention provides a deck mechanism wherein the drive power of a loading motor is utilized in all operation mode intervals, while in a loading (unloading) mode interval during which intermittently operating elements, namely, tape travel guide elements draw a tape out of a mouth of tape cassette and guide the tape around a head drum to be ready for a guiding of tape travel, the loading motor is stopped. The tape travel guide elements are moved to their tape loading positions, by a drive power of a capstan motor. In particular, pressing of slant post assemblies against V-shaped stoppers is achieved by using the drive power of a capstan motor. In accordance with the present invention, areas for arranging a tension post, a guide roller and etc. is ensured, thereby enabling the size of a cam to be reduced. Accordingly, it is possible to provide a deck having a compact and simple construction.

In accordance with the present invention, a clutch lever moves along a cam groove formed on the main cam. The clutch lever has at its one and a clutch gear adapted to selectively connect a driving gear mounted to the capstan motor and one of loading gears, that is, a take-up reel-side loading gear.

The clutch lever is also provided at its one side with a stopper for locking a take-up reel side loading gear. When the loading gear is disengaged from the driving gear of the capstan motor, the stopper prevents the loading gear from rotating so that a loading completion condition is stably maintained.

A rotary type mode switch is disposed below the loading gear, in order to sense the rotated position of the loading gear so that the main cam is stopped in response to a selected operation mode and rotated again by the loading motor after completion of loading or unloading of tape travel guide elements. The mode switch senses the start and end of the loading operation. Another mode switch is also disposed below the main cam, to sense other operation modes.

In accordance with the present invention, a reel latch is also provided, so as to prevent an idler rotatably mounted to an idler holder from coming into contact with a take-up reel of tape cassette and thereby rotating the take-up reel undesirably when the idler holder pivots toward the take-up reel, by the rotation of the capstan motor. Before the idler reaches the take-up reel, the reel latch comes into contact with the idler holder pivoting toward the take-up reel, thereby preventing the idler from coming into connect with the take-up reel. In an operation mode such as a playing mode, the reel latch is engaged at its one end in a recess formed at the idler holder so that the idler comes into contact with the take-up reel. At this time, the reel latch also releases the take-up reel, enabling it to rotate freely.

On the lower surface of a supply reel-side loading gear, a cam groove is formed, to which a tension lever is operatively connected. To the tension lever, a tension arm is operatively connected, so as to perform loading or unloading of the tape.

In accordance with the present invention, a driving pin is also provided, which is mounted on a loading lever of the slant post assembly connected to the take-up reel-side loading gear. When the slant post assembly performs its tape loading operation, a take-up arm is brought into contact with the driving pin and thus moved to perform its tape loading operation. The take-up arm is also in contact with the lower portion of a pinch roller mounted to a tension spring loaded pinch arm. Accordingly, the pinch arm is moved against the urging force of the tension spring, by the movement of the take-up arm. When the slant post assembly moves to its unloading position, the pinch arm itself returns to its original position, by the resilient force of the tension spring. By the force of the tension spring, the take-up arm also returns to its original position.

Below the pinch arm, a pinch lever is pivotally mounted on the same pivot pin as that of the pinch arm. A torsion spring is supported at both ends thereof by the pinch arm and the pinch lever. As the pinch lever is pushed by a cam pin fixed to the main cam, both the pinch arm and the pinch lever are rotated in the same direction by the torsion spring. According to the rotation of the pinch arm and the pinch lever, the pinch roller is brought into contact with a capstan shaft. As the pinch lever further rotates against the urging force of the torsion spring, the pinch roller is pressed against the capstan shaft.

As mentioned above, the present invention provides a deck mechanism capable of utilizing the capstan motor in performing loading and unloading operations of tape travel functioning elements. Upon performing required operation modes, necessary driving powers are distributively provided by the loading motor and the capstan motor. Accordingly, it is possible to provide a deck mechanism which is compact in size and simple in construction.

BRIEF DESCRIPTION OF THE DRAWINGS

Other objects and aspects of the invention will become apparent from the following description of embodiments with reference to the accompanying drawings in which:

FIGS. 1 and 2 are plan views of a deck mechanism according to the present invention, wherein FIG. 1 shows a tape unloading state of the deck mechanism and FIG. 2 shows a tape loading state of the deck mechanism;

FIGS. 6A to 6C are plan views illustrating a capstan roller driving part of the deck mechanism according to the present invention, wherein FIG. 6A shows a tape unloading state, FIG. 6B shows a state just before completion of tape loading, and FIG. 6C shows a state that a pinch roller is pressed against a capstan shaft.

DESCRIPTION OF THE PREFERRED EMBODIMENTS

Figure 1:
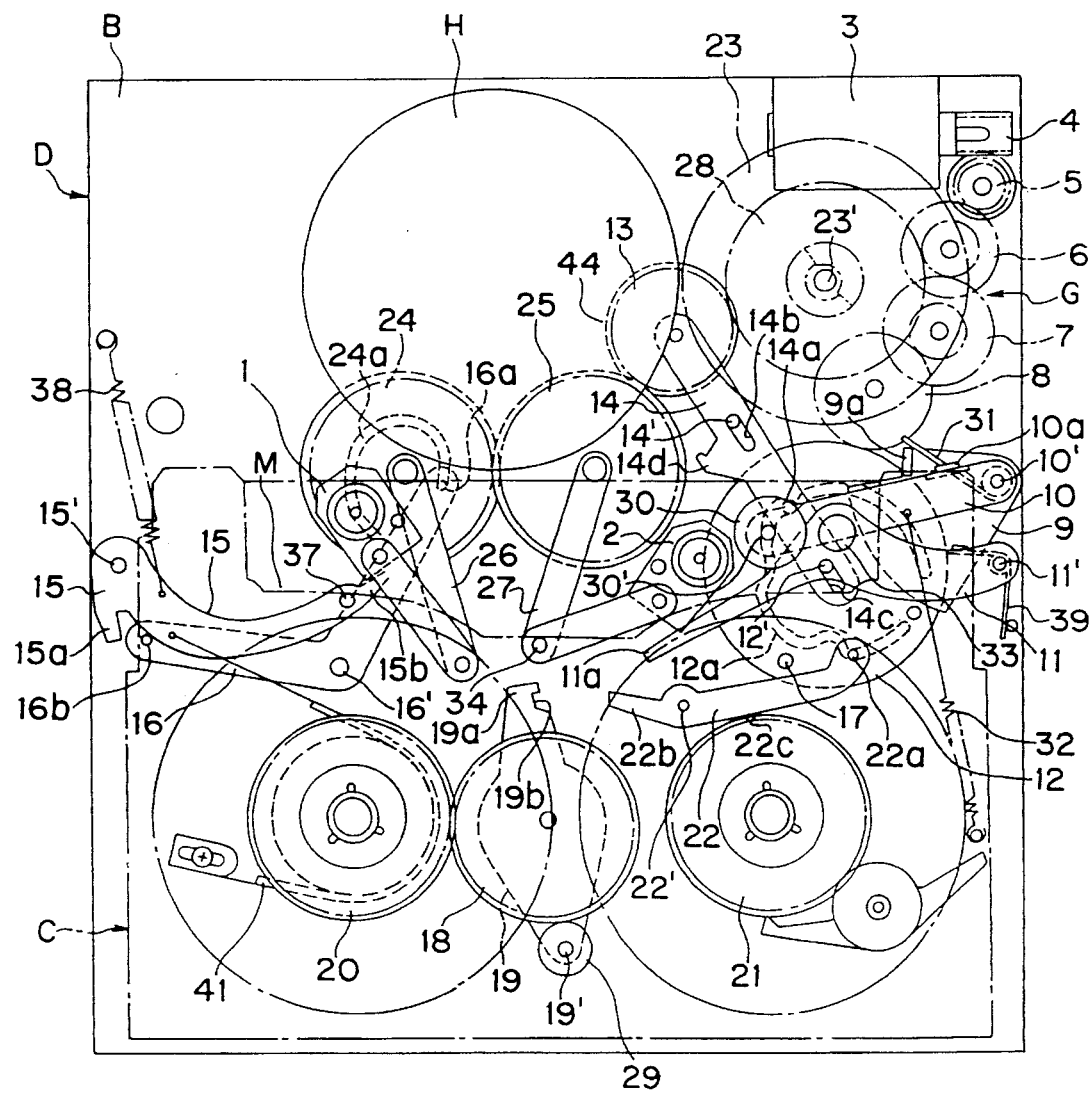
Figure 2:
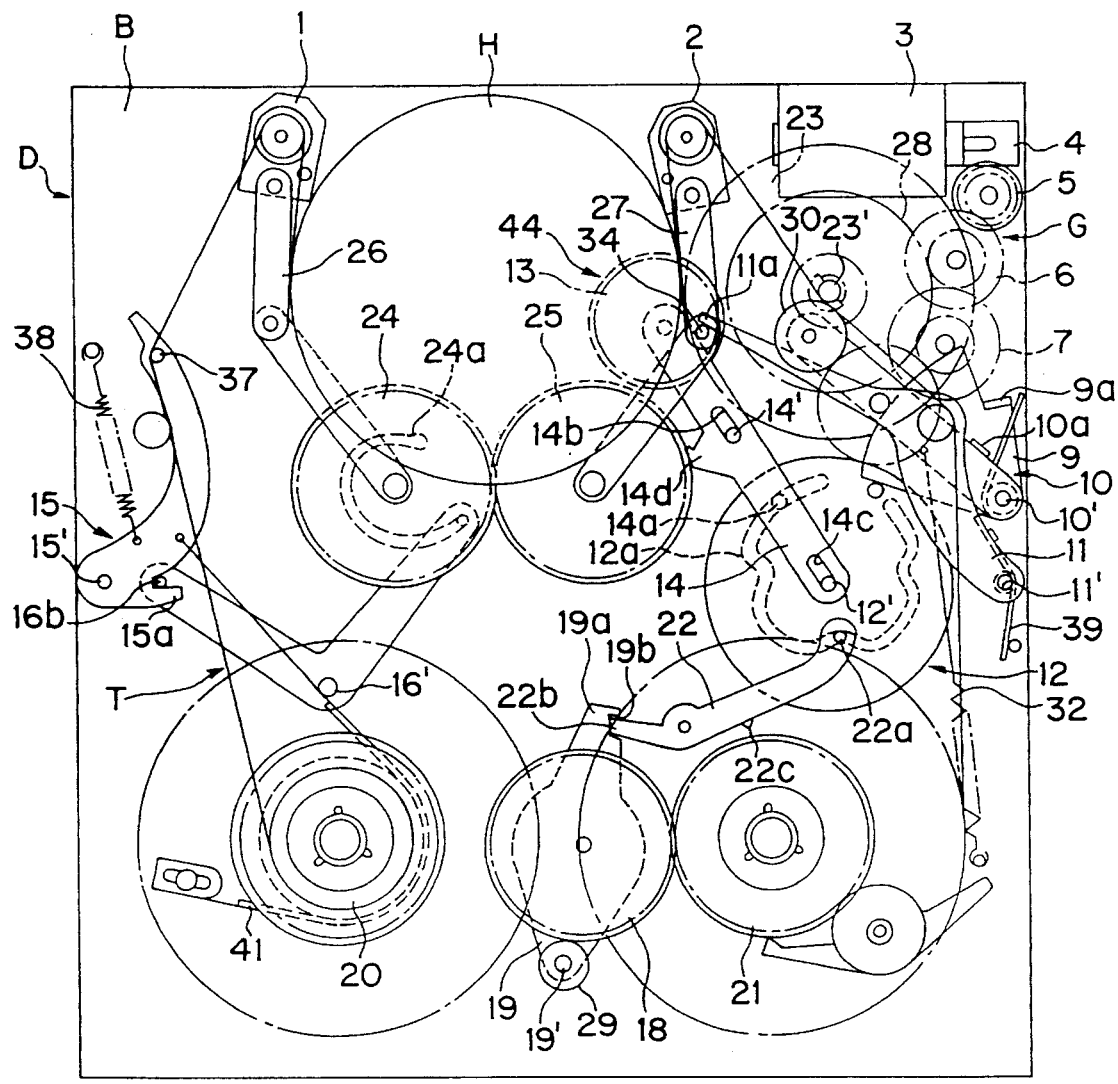
Figure 3:
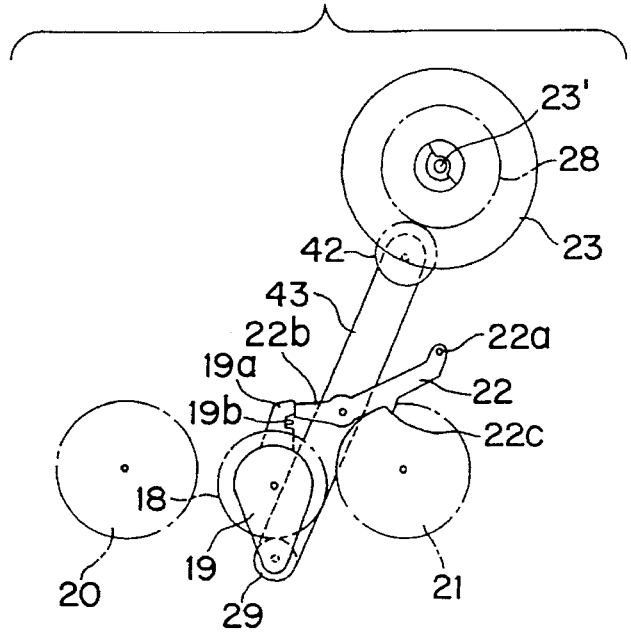
FIG. 3 is a plan view illustrating a reel driving part of the deck mechanism according to the present invention.
Figure 4:
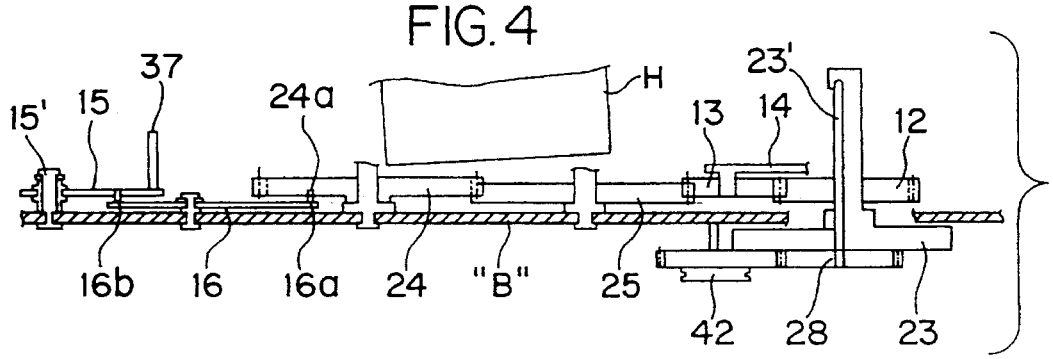
FIGS. 4 and 5 are sectional views illustrating levels of parts of the deck mechanism according to the present invention.
Figure 5:
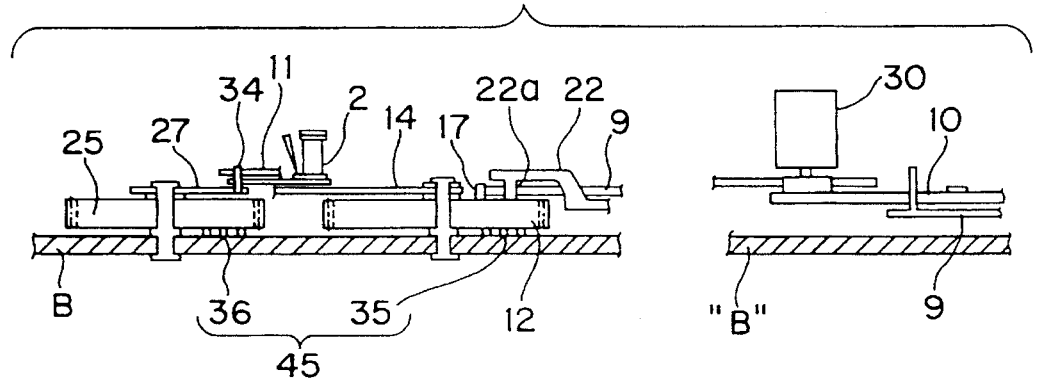

Referring to FIGS. 1 to 7, there is illustrated a deck mechanism in accordance with an embodiment of the present invention. FIG. 1 is a plan view illustrating the deck mechanism according to the present invention. FIGS. 4 and 5 are sectional views of the deck mechanism. As shown in the drawings, a head drum H is slantingly arranged at the rear intermediate portion of a deck D. In FIG. 1, a tape cassette C which has a tape supply reel 20 and a tape take-up reel 21 at both sides thereof is shown as having been loaded in the front portion of deck D.

Between the supply reel 20 and the take-up reel 21 of tape cassette C, an idler holder 19 is pivotally mounted on a main base B of deck D by means of a pin 19'. On the idler holder 19, an idler 18 is rotatably mounted. The idler holder 19 is provided at its rear end 19a with a recess 19b. At the front end, the idler holder 19 also has a driving member 29 which is provided with an input pulley (not shown) and engaged with the idler 18.

Below the head drum H, a pair of loading gears 24 and 25 are rotatably mounted on the main base B and maintained to be in mesh with each other, loading gears 24 and 25 correspond to the supply reel 20 and the take-up reel 21, respectively. The loading gear 24 has at its lower surface a cam groove 24a.

On rotation shafts of loading gears 24 and 25, loading levers 26 and 27, each of which comprises two lever members, are fixedly mounted at rear ends thereof to move pivotally between tape unloading and loading completion positions thereof, according to rotations of loading gears 24 and 25, respectively. At front ends of loading levers 26 and 27, a pair of slant post assemblies 1 and 2 are mounted, respectively. With this construction, slant post assemblies 1 and 2 can be moved between their unloading position where they are disposed within a mount M of the tape cassette C and their loading completion position where they are disposed around the head drum H, according to rotations of loading gears 24 and 25, respectively. By further small rotations of loading gears 24 and 25, slant post assemblies 1 and 2 are brought into pressing contact with V-shaped stoppers (not shown), respectively.

A loading motor 3 is disposed at the rear right portion of the main deck D. At the front of the loading motor 3, on the other hand, a main cam, namely, a cam gear 12 is rotatably mounted on the main base B, by means of a pin 12'. The cam gear 12 has a cam groove 12a at its upper surface. Between the loading motor 3 and the cam gear 12, a capstan motor 23 is fixedly mounted on the main base B. The loading motor 3 has a shaft to which a worm gear 4 is fixed. In order to transmit the drive power of loading motor 3 to the cam gear 12, a gear train G constituted by gears 5, 6, 7 and 8 is engaged with the worm gear 4. Below the capstan motor 23, a driving gear 28 is fixedly mounted to a capstan shaft 23' of the capstan motor 23, as shown in FIG. 4.

Between the driving gear 28 and the loading gear 25, a clutch mechanism 44 is provided, so as to transmit the drive power of the capstan motor 23 to loading geare 24 and 25, selectively. The clutch mechanism 44 comprises a clutch lever 14 having a pin 14a protruding downwardly and engaged in one portion of the cam groove 12a of cam gear 12 and a clutch gear 13 rotatably mounted to the rear end of the clutch lever 14. The clutch lever 14 also has a pair of slots 14b and 14c for receiving a guide pin 14' fixed to the main base B and the pin 12' of the cam gear 12, respectively, so that the clutch lever can slide longitudinally between its engagement and disengagement positions to engage/disengage the clutch gear 13 with/from both the driving gear 28 and the loading gear 25. With this construction, the loading gear 25 and thus loading gear 24 are selectively rotated by the rotation of driving gear 28, via the clutch gear 13 of clutch mechanism 44. The clutch lever 14 also has at its middle portion a stopper 14d protruding from the side surface of the clutch lever 14 toward the loading gear 25. The stopper 14d serves to limit the rotation of loading gear 25 to a predetermined range.

Above the cam gear 12, a reel latch 22 is pivotally mounted on the main base B, by means of a pin 22'. The reel latch 22 has at its rear end a downwardly extending pin 22a engaged in the other portion of the cam groove 12a of cam gear 12 so that it can pivot about the pin 22', according to the rotation of cam gear 12. The reel latch 22 also has at its front end an engaging portion 22b adapted to be selectively engaged in the recess 19b of idler holder 19, according to the pivotal movement of the idler holder 19. At the middle portion, the reel latch 22 also has a stopper 22c adapted to restrict the rotation of the take-up reel 21.

Near the cam gear 12, a pinch lever 9 and a pinch arm 10 are pivotally mounted to the main base B, by means of a common pin 10'. Around the pin 10', a torsion spring 31 is fitted which has both ends supported by supporting protrusions 9a and 10a formed at rear sides of the pinch lever 9 and the pinch arm 10, respectively. The torsion spring 31 functions to urge both the pinch lever 9 and the pinch arm 10 such that they pivot about the pin 10' in the same direction. The pinch lever 9 is selectively brought at its front side in contact with a cam pin 17 protruding upwardly from the upper surface of the cam gear 12. As the cam gear 12 rotates counter clockwise accordingly, the pinch lever 9 and thus the pinch arm 10 can pivot about the pin 10' in a clockwise direction, by the urging force of cam pin 17. The pinch arm 10 has at its rear end a pinch roller 30 which is adapted to urge a travelling tape against the capstan shaft 23'. The pinch roller 30 is rotatably mounted to the pinch arm 10, by means of a pin 30' which has a lower portion extending downwardly below the pinch arm 10. A tension spring 32 is connected at its one end to the pinch arm 10 and adapted to urge the pinch arm 10 into pivoting about the pin 10' frontwards, namely, counter clockwise. The other end of tension spring 32 is fixed to the main base B.

At the front of pinch arm 10, a take-up arm 11 is pivotally mounted to the main base B by means of a pin 11'. The take-up arm 11 is provided at its middle portion with a guide roller 33. Around the pin 11', a torsion spring 39 is fitted which urges the take-up arm 11 to pivot about the pin 11' a clockwise direction. By the urging force of torsion spring 39, the take-up arm 11 is in pressing contact with the lower portion of the pin 30'. Since the pinch arm 10 is urged to pivot in a clockwise by the tension spring 32, the pinch lever 9, the pinch arm 10 and the take-up arm 11 are maintained together at a position that is determined by a force balance established among the above-mentioned three springs 31, 32 and 39. In a loading operation mode where the tilting post assembly 2 moves to its loading completion position near the head drum H, the take-up arm 11 pivots clockwise, in that a driving pin 34 protruding upwardly from the middle portion of loading lever 27 pushes the rear end 11a of take-up arm 11 rearwards against the urging force of tension spring 32.

On the other hand, rotary type mode switches 35 and 36 which constitute mode sensing means 45 are disposed below the cam gear 12 and the loading gear 25, respectively, as shown in FIG. 5. The mode switch 35 for the cam gear 12 is adapted to recognize all mode intervals, whereas the mode switches 36 for the loading gear 25 is adapted to recognize a tape loading interval.

Herein, "a mode interval" means an interval between two sequential operation modes.

Below the loading gear 24, a tension lever 16 is pivotally mounted to the main base B, by means of a pin 16'. The tension lever 16 is provided at its rear end with a pin 16a engaged in the cam groove 24a on the lower surface of loading gear 24, so that it pivots about the pin 16', according to the rotation of loading gear 24. The tension lever 16 has also at its front end a pin 16b. Above the tension lever 16, a tension arm 15 is pivotally mounted to the main base B, by means of a pin 15'. The tension arm 15 is provided at its one end with an upwardly extending tension post 37. The tension arm 15 also has at the other end thereof a frontward extending protrusion 15a. The protrusion 15a is selectively engaged with the pin 16b of tension lever 16. To the tension arm 15, a tension spring 38 is connected, so as to urge the tension lever 15 into pivoting counter-clockwise.

As shown in FIGS. 3 and 4, a gear pulley 42 is rotatably mounted to the main base B such that it engages with the driving gear 28 fixed to the capstan shaft 23' of capstan motor 23. The gear pulley 42 is operatively connected with the input pulley (not shown) equipped in the driving member 29 of idler holder 19, via a belt 43. Accordingly, the idler 18 can rotate by the drive power of capetan motor 23.

In FIG. 1, the reference numeral 41 denotes a tension band wrapped around the supply reel 20.

Figure 7:
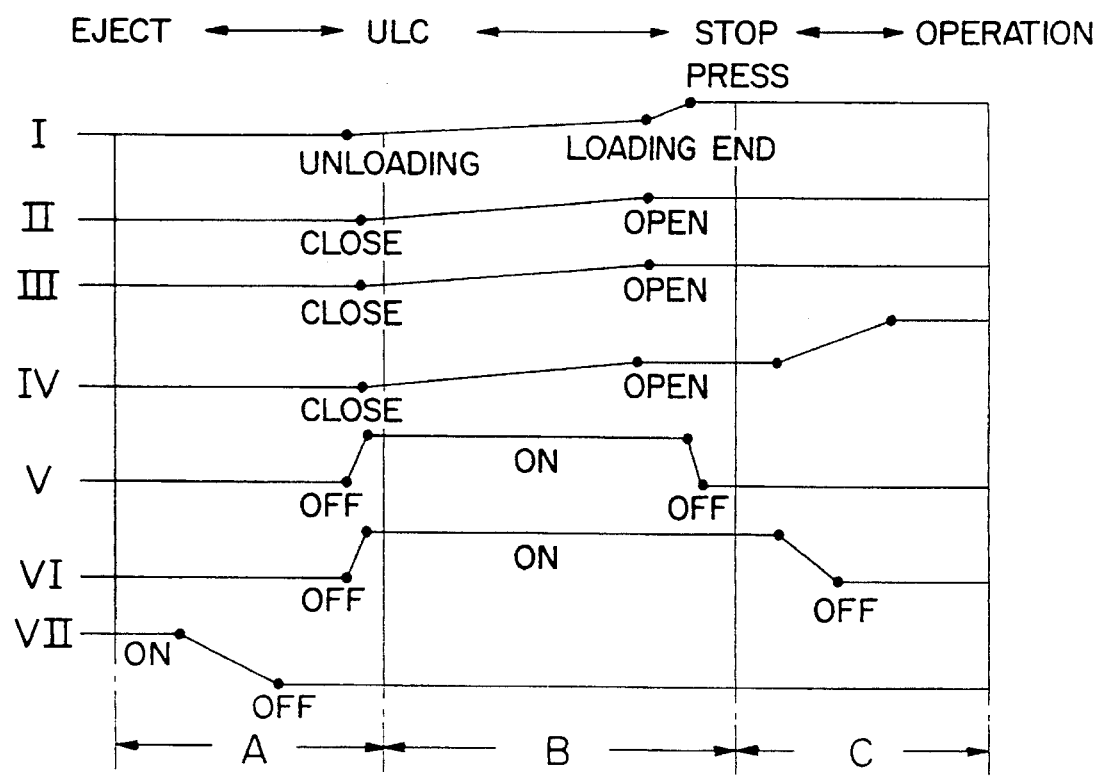
FIG. 7 is a mode sequence chart of the deck mechanism according to the present invention.

FIG. 7 shows operative relationships among various functioning parts of the deck mechanism according to the present invention. In FIG. 7, graphs I to VII illustrate respective operative connections of the functioning parts described in the following table.

TABLE

| Graph | Element | Operative connection |
| --- | --- | --- |
| I | Supply reel and take-up reel-side tilting post assemblies | to Capstan motor |
| II | Tension arm | to Supply reel-side tilting post assembly |
| III | Take-up arm | to Take-up reel-side tilting post assembly |
| IV | Pinch roller | to Take-up reel tilting post assembly in loading and to Cam gear in pressing |
| V | Clutch lever | to Cam gear |
| VI | Reel latch | to Cam gear |
| VII | Ejecting lever | to Cam gear |

In FIG. 7, intervals A and C correspond to a driving interval by the loading motor 3, whereas the interval B corresponds to a driving interval by the capstan motor 23.

Now, operation of the deck mechanism according to the present invention will be described in detail.

FIG. 1 shows a condition in which most tape travel guiding elements such as slant post assemblies 1 and 2, the tension post 37 of tension arm 15, the pinch roller 30 of pinch arm 10 and the guide roller 3 pivotally mounted to the take-up arm 11 are disposed within the mouth M of tape cassette C. This condition corresponds to an ejecting mode or unloading mode of the deck mechanism.

FIG. 2 shows a condition in which tape travel guiding elements have completed their loading operations, so as to guide the travel of tape T. This condition corresponds to a play mode of the deck mechanism.

An apparent from FIG. 7 which is a mode sequence chart of the deck mechanism according to the present invention, the deck mechanism performs ejecting of the tape cassette C in an ejecting mode and loading of the tape cassette C in the deck in an unloading mode. In a tape loading mode, tape travel guiding elements of the deck mechanism guide the tape T such that is is arranged along a tape travel path. After completion of tape loading operation, the deck mechanism performs basic functional operations for, for example, playback, recording and etc., in an operation mode followed by a stop mode. Respective operations of parts of the deck mechanism will now be described in conjunction with operation modes.

First, in a mode interval between the ejecting mode and the unloading mode, most parts of the deck mechanism are not operated. When the operation of the deck is going to the ejecting mode, however, an ejecting lever operates to release a locking device equipped in a cassette housing of the tape cassette C, so as to eject the tape cassette C from the deck, although not shown in the drawings.

When the operation is going from the unloading mode to the stop mode, the driving power of the loading motor 3 is transmitted to the cam gear 12, via the gear train G, thereby causing the cam gear 12 to rotate counter-clockwise. By the rotation of cam gear 12, the pin 14a protruding downwardly from the clutch lever 14 moves along the cam groove 12a of cam gear 12, so that the clutch lever 14 slides frontwards, thereby causing the clutch gear 13 to be engaged with both the driving gear 28 and the loading gear 25.

At the same time, the reel latch 22 pivots counter-clockwise about the pin 22' such that the pin 22a of the reel latch 22 moves along the cam groove 12a of rotating cam gear 12. The reel latch 22 moves to a position at which it prevents the take-up reel 21 from rotating.

When the cam gear 12 reaches the end of the above-mentioned mode interval, the mode switch 35 disposed below the cam gear 12 senses the start of the loading mode. In response to the sensing of mode switch 35, the operation of loading motor 3 is stopped.

Subsequently, the capstan motor 23 rotates counter-clockwise, to perform the tape loading operation. By the rotation of capstan motor 23, the clutch gear 13 engaged with the driving gear 28, the loading gear 25 engaged with the clutch gear 13 and the loading gear 24 engaged with the loading gear 25 rotate together. As a result, two links, that is, two slant post assemblies 1 and 2 operatively connected to loading gears 24 and 25 via loading levers 26 and 27 draws the tape T out of the supply reel 20 and guides it to a position at which the tape T is wound around the head drum H.

Figure 6A:
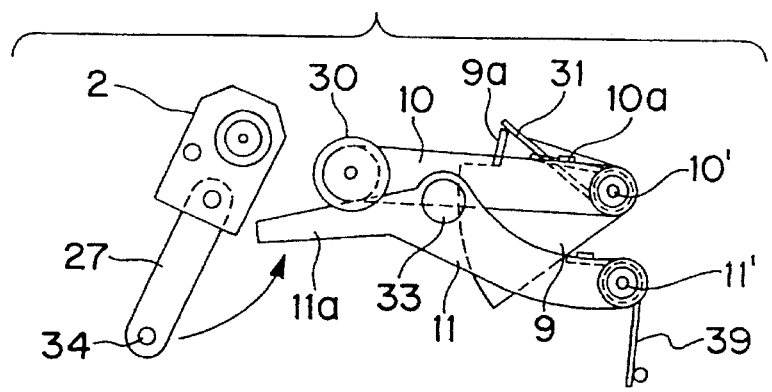
Figure 6B:
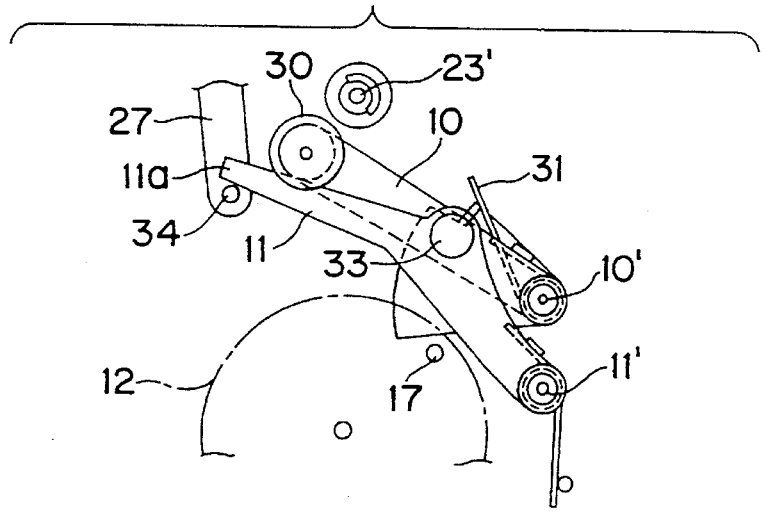

At this time, the driving pin 34 formed on the loading lever 27 comes into contact with the rear end 11a of take-up arm 11 and pivots the take-up arm 11 about the pin 11' rearwards, namely, clockwise, as shown in FIGS. 6A and 6B.

In the unloading mode, the pinch arm 10 is urged by the tension spring 32 connected thereto, to pivot counter-clockwise, namely, in a closing direction that the tape T is retracted into the tape cassette C. On the other hand, the take-up arm 11 is urged by the torsion spring 39, to pivot clockwise namely, in an opening direction such that the tape T is drawn out of the tape cassette C. Since the tension spring 32 has a spring force greater than that of the torsion spring 39, the pinch arm 10 and the take-up arm 11 are normally maintained in their closing states, under the condition that the take-up arm 11 is in contact with the lower portion of pin 30' for mounting the pinch roller 30.

On the other hand, the pinch arm 10 and the pinch lever 9 disposed below the pinch arm 10 are urged by the torsion spring 31, to pivot together in the same direction, as mentioned above. With this arrangement, the pinch arm 10 and thus the pinch lever 9 are pivoted about the pin 10' in a clockwise direction, according to the above-mentioned rearward pivoting of take-up arm 11, as shown in FIG. 6B. The pivoting is carried out until a loading completion state is obtained. In this loading completion state, slant post assemblies 1 and 2 have been moved to their loading completion positions at which loading levers 26 and 27 can no longer move rearwards. At this time, however, the pinch roller 30 is not yet brought into pressing contact with the capstan shaft 23'. On the other hand, the guide roller 33 of the take-up arm is maintained to be located on the tape travel path.

As the capstan motor 23 further rotates in the same direction at the above-mentioned state, slant post assemblies 1 and 2 are brought into pressing contact with V-shaped stoppers (not shown) respectively.

Thus the tape loading operation is completed. This loading completion is sensed by the mode switch 38 disposed below the loading gear 25, thereby causing the capstan motor 23 to be stopped.

On the other hand, when the slant post assembly 1 moves in the opening direction at a predetermined range, during the loading operation, the tension arm 15 which has been maintained in its closing state, namely, its unloading completion state, by the slant post assembly 1 itself moves to its opening position, by the urging force of the spring 38.

During the loading operation, the tape T is drawn only out of the supply reel 20, since the reel latch 22 controls the rotation of take-up reel 21. At this time, the driving member 29 rotatably to the idler holder 19 rotates in a clockwise direction, by the driving power of capstan motor 23 transmitted via the driving motor 23, the gear pulley 42 and the belt 43. As a result, the idler holder 19 and the idler 18 mounted thereto pivot toward the take-up reel 21. Since the engaging portion 22b of reel latch 22 is brought into contact with the rear end 19a of the idler holder 19, the pivoting of idler holder 19 is limited to a predetermined range, so that the idler 18 is not in contact with the take-up reel 21.

After completion of tape loading, the loading motor 3 drives again to rotate the cam gear 12 in counter-clockwise. By the anti-clockwise rotation of cam gear 12, the clutch lever 14 slides rearwards, thereby causing the clutch gear 13 to be disengaged from both the driving gear 28 of capstan motor 23 and the loading gear 25. This state corresponds to the stopping mode. At this time, the stopper 14d formed at one side of the clutch lever 14 is brought into engagement with the loading gear 25 and serves to prevent a reversed rotation of the loading gear 25.

When the operation is going from the stopping mode to the function mode, only the pinch roller 30 and the reel latch 22 are moved, while other parts of the deck mechanism are maintained at their stopped states. As the cam gear 12 moves further after completion of tape loading shown in FIG. 2, the cam pin 17 protruding from the cam gear 12 urges the pinch lever 9 into pivoting clockwise, against the urging force of torsion spring 31.

Figure 6C:
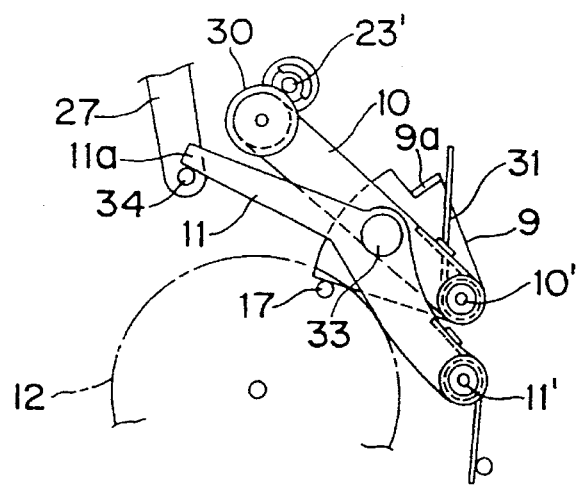

According to the clockwise pivoting of pinch lever 9, the pinch arm 10 pivots in the same direction as that of the pinch lever 9 against the urging force of tension spring 32, by virtue of the torsion spring 31, so that the pinch roller 30 mounted to the pinch arm 10 is brought into contact with the capstan shaft 23', as shown in FIG. 6C. By further clockwise pivoting of the pinch lever 9, the pinch roller 30 is pressed against the capstan shaft 23'.

At this time, the reel latch 22 pivots counter-clockwise along the cam groove 12a of cam gear 12, so that the take-up reel 21 is released from the reel latch 12, so as to rotate freely. During the pivoting of reel latch 22, the engaging portion 22b of reel latch 22 is brought into engagement within the recess 19b of idler holder 19. Accordingly, a clockwise pivoting of the idler holder 19 is prevented, by virtue of an inter-engagement obtained between the idler holder 19 and the reel latch 22, thereby enabling the idler 18 to be in contact with the take-up reel 21 and transmit the rotation force to the take-up reel 21.

At this state, it is possible to perform a desired function mode such as a playing. Upon going from the function mode to the ejecting mode again, the operation is performed in a reversed manner as mentioned above. When the operation is going from the loading completion state to the loading start state, the capstan motor 23 rotates in a direction opposite to that in the loading mode. Accordingly, the idler holder 19 pivots counter-clockwise, so that the idler 18 comes into contact with the supply reel 20 and takes up the tape T around the supply reel 20.

At this time, the tension lever 16 pivots counter-clockwise along the cam groove 24a of loading gear 24 and pushes the protrusion 15a of tension arm 15, thereby causing the tension arm 15 to pivot clockwise.

After the tension arm 15 pivots clockwise through a predetermined range, it is retracted to its closing position, by the slant post assembly 1.

As apparent from the above description, the present invention provides a deck mechanism which enables the use of a single loading motor for achieving all operation modes and yet has a simple construction with a compact main cam. Where a single motor is used for achieving all operation modes, the prior art has encountered a problem that the main cam is large in size and complex in construction, since it should control all mode intervals.

During all mode operations such as ejecting, unloading, loading, stopping and functional operations, the main cam is operated in all mode intervals. On the other hand, parts operating only during loading and unloading operations require an intermittent actuating device for operating the parts only in a loading mode interval. As a result, the overall construction in the prior art is complex. According to the present invention, however, an idle power of the capstan motor is utilized for operating various parts in the loading mode interval, thereby enabling the overall construction to be simplified. Even in case of a long loading mode interval, that is, when a tape travel path is lengthened due to an increase in a drum wrapping angle of tape, it is possible to make the overall construction easy.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A deck mechanism for a magnetic record and playback device comprising:

a pair of slant post assemblies provided to correspond to a supply reel and a take-up reel of a tape cassette for drawing a tape out of said tape cassette such that the tape is located along a predetermined travel path and return the tape to the tape cassette, respectively;

a pair of loading gears operatively connected to said slant post assemblies by means of a pair of loading levers for moving the slant post assemblies between their tape loading and unloading positions, according to rotations thereof, respectively;

a loading motor;

a capstan motor provided with a capstan shaft to which a driving gear is fixed by mounted;

a pinch roller pressed against said capstan shaft so as to pinch the tape therebetween;

a reel latch to selectively prevent said take-up reel of the tape cassette from rotating;

a cam gear operatively connected to both said loading motor and said reel latch so as to transmit a drive power of the loading motor to the reel latch;

clutch means for selectively transmitting/not transmitting a drive power of said capstan motor from said driving gear to a take-up reel-side one of said pair of loading gears; and mode sensing means for sensing loading and unloading modes of said deck mechanism, wherein said mode sensing means comprises a pair of rotary type mode switches for stopping the rotation of said cam gear, driving said capstan motor so as to load or unload tape travel guide elements in accordance with a selected mode, and then sensing the rotated position of said loading gear so as to drive the cam gear by the drive power of the loading motor, said switches being disposed below the loading gear and the cam gear, respectively, wherein said mode sensing means senses the loading start and loading end states and senses an operation mode such as a playing mode;

wherein said deck mechanism moves the slant post assemblies by using the drive power of the capstan motor during loading and unloading mode intervals, simultaneously with locating slant post assemblies at loading completion positions thereof, while it transmits the drive power of the loading motor to said cam gear during other mode intervals.

2. A deck mechanism for a magnetic record and playback device, comprising:

a capstan motor;

a loading motor;

a driving gear securely mounted to a shaft of the capstan motor;

a pair of loading gears for driving a pair of loading levers in order to load/unload a tape from a tape cassette to/from a head;

clutch means for transmitting a rotation force of the capstan motor through the driving gear to one of the loading gears as a driving force;

a cam gear operatively connected to said loading motor and said clutch means for receiving a rotation force from the loading motor and transmitting the rotation force to said clutch means wherein said clutch means engages with and disengages from the driving gear and one of the loading gears according to a rotation of said cam gear;

a pinch arm, pivotally mounted on a main base, provided with a pinch roller and urged to be rotated toward a capstan shaft by a first spring;

a take-up arm, pivotally mounted on the main base, urged to be rotated toward the capstan shaft by a second spring;

a tension spring, connected to the pinch arm, for urging the pinch arm to be rotated against the capstan shaft, thereby causing the pinch arm and the take-up arm to be in a pressure contact so that the pinch arm and the take-up arm are maintained together at a position determined by a force balance established among the first, the second and the tension spring; and a pin, fixedly mounted to one of the loading levers, which comes into contact with said take-up arm when the pair of loading levers move to a loading position, thereby causing the take-up arm and the pinch arm to move toward a loading position.

3. The deck mechanism for a magnetic record and playback device according to claim 2, wherein said mechanism further comprises:

a pinch lever pivotally mounted to a pin of said pinch arm, below the pinch arm;

a torsion spring fitted around said pin, said torsion spring being supported at both ends by supporting protrusions formed at the pinch lever and the pinch arm, respectively, such that the pinch lever and the pinch arm pivot together in the same direction; and a cam pin fixed to said cam gear which comes into contact with the pinch lever and push the pinch lever according to the rotation of the cam gear, wherein the pinch lever further rotates at a predetermined angle after said pinch roller has been in contact with a capstan shaft during a loading mode, thereby causing the pinch roller to be pressed against said capstan shaft by urging the force of said torsion spring.

4. A deck mechanism for a magnetic record and playback device, comprising:

a capstan motor;

a loading motor;

a driving gear securely mounted to a shaft of the capstan motor;

a pair of loading gears for driving a pair of loading levers in order to load/unload a tape from a tape cassette to/from a head;

clutch means for transmitting/not transmitting a rotation force of the capstan motor through the driving gear to one of the loading gears as a driving force;

a cam gear operatively connected to said loading motor and said clutch means for receiving a rotation force from the loading motor and selectively activating said clutch means frontwards or rearwards by the rotation of said cam gear whereby said clutch means engages with and disengages from the driving gear and one of the loading gears according to a rotation of said cam gear;

a tension lever provided at its one end with a first pin inserted into a cam groove of one of the loading gears and at the other end with a second pin; and a tension arm provided at one end with a protrusion which contacts with said second pin in a loading position and supported at the other end by a slant post assembly operatively connected to said one of the loading gears, wherein rotation of said one of said loading gears moves the slant post assembly between an unloading position and the loading position and correspondingly moves said tension lever to enable movement of said tension arm into the loading position.

* * * * *